United States Patent [19]

Bozzelli et al.

[11] 4,100,256

[45] Jul. 11, 1978

[54] HYDROLYSIS OF CARBON OXYSULFIDE

[75] Inventors: John W. Bozzelli, Midland; Donald N. Bremer, Freeland; George D. Shier, Midland, all of Mich.

[73] Assignee: The Dow Chemical Company, Midland, Mich.

[21] Appl. No.: 778,903

[22] Filed: Mar. 18, 1977

[51] Int. Cl.$^2$ .............................................. B01D 53/34
[52] U.S. Cl. ..................................... 423/220; 423/226; 423/228; 423/243; 423/437; 423/563; 423/564
[58] Field of Search ............... 423/226, 228, 220, 229, 423/242, 243, 437, 563, 564; 55/68, 73; 260/268 MK

[56] References Cited

U.S. PATENT DOCUMENTS

| | | | |
|---|---|---|---|
| 2,653,153 | 9/1953 | de Benneville | 260/268 MK |
| 3,098,705 | 7/1963 | Bally | 423/243 |
| 3,660,017 | 5/1972 | Honsberg | 423/563 X |
| 3,989,811 | 11/1976 | Hill | 423/229 X |

FOREIGN PATENT DOCUMENTS

| | | | |
|---|---|---|---|
| 450,519 | 7/1936 | United Kingdom | 423/228 |

*Primary Examiner*—Earl C. Thomas
*Attorney, Agent, or Firm*—Glwynn R. Baker

[57] ABSTRACT

The hydrolysis of carbon oxysulfide is catalyzed by piperazinone and alkyl-substituted piperazinones at ambient or below ambient temperatures. The hydrolysis step can be combined with a sour gas purification process in the treatment of refinery gases, coal gasification streams, and other such gases which contain COS and other acidic contaminants.

9 Claims, No Drawings

HYDROLYSIS OF CARBON OXYSULFIDE

BACKGROUND OF THE INVENTION

This invention relates to a method for hydrolyzing carbon oxysulfide, more particularly to a method whereby the hydrolysis is catalyzed by a water-soluble organic compound.

Carbon oxysulfide is often present in minor amounts in petroleum refinery gases and it is found in larger amounts in coal gasification product streams. This toxic contaminant poses a special problem in sour gas purification processes since it is neither readily separated nor easily hydrolyzed by known gas treating solvents under ordinary conditions. It is an undesirable contaminant in a Claus plant feed stream, since it is not readily converted to sulfur, and it is necessary to remove it from fuel gases and the like for reasons of corrosion and air pollution. Carbon oxysulfide reacts irreversibly with ethanolamine but this is not usually a practical method for removing it from a gas stream because the solvent cannot be regenerated. Carbon oxysulfide can be hydrolyzed to $H_2S$ and $CO_2$ but prior art processes for accomplishing this usually involve high process temperatures, relatively insoluble catalysts, or other disadvantageous features, see U.S. Pat. No. 3,660,017, French Pat. No. 2,062,138, and W. German Offenl. 2,250,169.

SUMMARY OF THE INVENTION

It has now been found that carbon oxysulfide is rapidly and efficiently hydrolyzed to $H_2S$ and $CO_2$ when it is contacted with an aqueous solution of a piperazinone compound of the formula

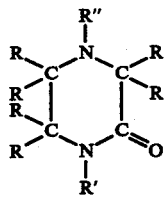

wherein $R'$, $R''$, and each R is independently a hydrogen atom or an alkyl group of 1-5 carbon atoms. The hydrolysis can be carried out effectively using a piperazinone compound solution containing only a molar equivalent quantity of water based on the COS present, but preferably the hydrolysis process is operated with a piperazinone solution containing about 1-25 percent by weight of water. Any process temperature where the piperazinone compound catalyst remains in the liquid state is operable although a temperature in the range of about 10°-175° C is usually preferred and a temperature from ambient temperature to about 50° C is most preferred.

DETAILED DESCRIPTION OF THE INVENTION

Piperazinone compounds applicable to the invention can be prepared by any of several known methods, see particularly Strong et al., U.S. Pat. No. 2,649,450 and 2,700,668. 1,4-Dialkylpiperazinones and particularly 1,4-dimethylpiperazinone are preferred. Other preferred piperazinones include 3-methylpiperazinone, 4-ethylpiperazinone, 3,3,4-trimethylpiperazinone, 1-ethyl-4-methylpiperazinone, and 1-tert-butyl-4-methylpiperazinone.

These piperazinones are hygroscopic and, since most gas streams of the kind treated by this process normally contain more or less water vapor, in practice there is almost always some water present as the process continues even when the piperazinone compound solution is initially essentially anhydrous.

The aqueous piperazinone solution can also include a substantial proportion of one or more known gas-treating solvents; for example, an alkanolamine or sulfolane. Lower alkanolamines such as ethanolamine, diethanolamine, N-methyldiethanolamine, triethanolamine, isopropanolamine, and diisopropanolamine are common examples of that class. Such an additional solvent can comprise up to about 90 percent by weight of the piperazinone-containing solution although preferably it is limited to about 60 percent of the total. The hydrolysis of COS in the presence of the piperazinone compound is apparently a catalytic effect and this effect is facilitated by the increased solubility of COS in the solution provided by an additional solvent such as sulfolane or an alkanolamine or pressure. Any significant proportion of piperazinone in the solution will promote the hydrolysis to some extent, but a more practical rate of hydrolysis is obtained when the piperazinone comprises at least about 35 percent of the gas-treating solution. Since the maximum proportion of water is preferably about 25 percent of the solution, when the piperazinone is the sole organic component its minimum preferred proportion in that case is, of course, about 75 percent.

The class of piperazinone compounds described herein and their concentrated aqueous solutions are also selective absorbents for $H_2S$ and lower alkyl mercaptans in the presence of $CO_2$ as described in application S.N. 778,904 of J. W. Bozzelli, G. D. Shier, R. L. Pearce, and C. W. Martin entitled Absorption of Sulfur Compounds from Gas Streams filed concurrently herewith, the disclosure of which is hereby incorporated by reference. Therefore, the COS hydrolysis and $H_2S$ absorption can be combined in a single contacting step under some conditions, for example, when the gas-treating solution consists of the piperazinone compound and a minor amount of water with no other solvent present to affect its selective action. Alternatively, a COS-containing gas can be contacted with the aqueous piperazinone compound in a first stage under the conditions described herein to hydrolyze at least the major part of the COS and absorb at least some of the $H_2S$ and mercaptans present, then the gas purification process is completed in a second stage using either a piperazinone compound absorption medium or a conventional sour gas scrubbing solvent such as an aqueous alkanolamine, sulfolane, or other such gas scrubbing solvent.

The hydrolysis process can be run at any convenient pressure and atmospheric or superatmospheric pressure is preferred. Contact time can vary widely from a few seconds to an hour or more depending upon the temperature, concentration and composition of the aqueous piperazinone solution, and the amount of COS present in the gas being treated.

Desorption of $H_2S$ absorbed after the hydrolysis is efficiently accomplished by merely heating the aqueous piperazinone medium to a temperature of about 85° C or above, preferably to 100°-150° C. Moderately reduced pressure will accelerate the desorption to some extent although this is usually not necessary.

EXAMPLES 1–6

A stainless steel Parr bomb of 155 ml capacity and equipped with a pressure gauge, an inlet needle valve, and a safety relief seal was charged with 50 g of test solvent. Air was then evacuated from the bomb, methane was admitted to atmospheric pressure, and the bomb was pressurized to 25 lbs gauge pressure with $H_2S$, then to 75 lbs with COS. The temperature of the bomb was adjusted where necessary to the desired level with an electrical heater and the bomb was agitated in a rocker mechanism for a predetermined length of time. At this point, the pressure within the bomb was read and the gas above the solvent was analyzed by a gas chromatograph. Several runs were made using known solvents for sour gas treatment for purpose of comparison. Results of these experiments are listed in Table I.

TABLE I

| Example No. | Solvent (% by weight) | Time Min. | Temp. °C | Final Pressure psig | Gas Analysis, Wt. % | | | |
|---|---|---|---|---|---|---|---|---|
| | | | | | $H_2S$ | COS | $CO_2$ | $CH_4$ |
| 1 | 90% NNDP + 10% $H_2O$ | 60 | 25 | 35 | 18 | 0.0 | 69 | 12.0 |
| 2 | 90% NNDP + 10% $H_2O$ | 60 | 55 | 45 | 23 | 0.0 | 66 | 10.0 |
| 3 | 90% NNDP + 10% $H_2O$ | 10 | 25 | 44 | 23 | 2.0 | 62 | 12.0 |
| 4 | 90% NNDP + 10% $H_2O$ | 20 | 100 | 80 | 33 | 0.0 | 59 | 7.0 |
| 5 | recycled from Ex. 4$^{(a)}$ | 20 | 25 | 40 | 26 | 5.0 | 61 | 8.0 |
| 6 | recycled from Ex. 5$^{(a)}$ | 45 | 85 | 80 | 36 | 1.0 | 59 | 4.0 |
| A | 90% MDEA + 10% $H_2O$ | 20 | 25 | <10 | 8 | 76.0 | 1 | 17.0 |
| B | 90% MDEA + 10% $H_2O$ | 40 | 100 | 32 | 17 | 34.0 | 32 | 18.0 |
| C | 90% NMP + 10% $H_2O$ | 20 | 25 | <10 | 21 | 16.0 | 50 | 12.0 |
| D | 90% NMP + 10% $H_2O$ | 50 | 100 | 60 | 28 | 1.5 | 62 | 8.5 |
| E | 80% sulfolane 10% DIPA 10% $H_2O$ | 10 | 25 | <10 | 22 | 64.0 | 0 | 13.0 |
| F | | 120 | 100 | 65 | 40 | 3.0 | 51 | 6.0 |

$^{(a)}$Solvent was regenerated by heating to 100° C and venting.

Terms:
NMP = N-methyl-2-pyrrolidinone
DIPA = Diisopropanolamine
NNDP = 1,4-dimethylpiperazinone
MDEA = N-methyldiethanolamine It is readily seen from control experiments A through F that the known sour gas treating solvents were generally substantially less effective than the piperazinone solution in removing COS from the gas mixture.

However, such known solvents can be advantageous in combination with the piperazinone compounds described herein. Examples 7–14 show the effects of using such combined solvents under various conditions.

EXAMPLES 7–9

A qualitative test for rapid evaluation of relative efficiency for COS hydrolysis was run with various aqueous alkanolamine solutions containing 1,4-dimethylpiperazinone (NNDP). A 500 ml flask equipped with stirrer, reflux condenser, and gas inlet bubbler was charged with 300 ml of the test solution and this was heated to reflux temperature. The gas feed (3 percent by volume COS in $N_2$) was bubbled into the hot liquid at 500 ml per minute and the off gas was analyzed by gas chromatography for COS content. Test time for each composition was 1–2 hours. Some comparative tests with other gas-treating solutions are also listed.

TABLE II

| Example No. | Aqueous Alkanolamine Composition (% by weight) | % COS Hydrolysis |
|---|---|---|
| 7 | 55% NNDP-35% DEA-10% $H_2O$ | 85 |
| 8 | 55% NNDP-35% DIPA-10% $H_2O$ | 75 |
| 9 | 55% NNDP-35% MDEA-10% $H_2O$ | 59 |
| G | 55% Sulfolane-35% DEA-10% $H_2O$ | 82 |
| H | 55% Sulfolane-35% DIPA-10% $H_2O$ | 56 |

TABLE II-continued

| Example No. | Aqueous Alkanolamine Composition (% by weight) | % COS Hydrolysis |
|---|---|---|
| I | 4% $K_2CO_3$ in 50% aqueous MDEA | 25 |

DEA = diethanolamine
MDEA = N-methyldiethanolamine
DIPA = diisopropanolamine
NNDP = 1,4-dimethylpiperazinone The efficiency of COS hydrolysis is highly dependent upon COS solubility in the gas-treating solvent. As shown by Examples 7–9, secondary alkanolamines are somewhat more effective in this respect than the tertiary alkanolamine MDEA. When 50 percent aqueous NNDP was tested by this procedure, no alkanolamine being present, the COS hydrolysis was only 15 percent.

EXAMPLES 10–12

These tests were made by the procedure of Examples 7–9 using lower concentrations of NNDP in a more dilute aqueous alkanolamine, 50 percent MDEA in water. The effect of the higher water concentration plus the lower NNDP concentration on the efficiency of the COS hydrolysis is considerable. However, this was at atmospheric pressure and more efficient hydrolysis would take place at superatmospheric pressure.

TABLE III

| Example No. | NNDP Wt.% | % COS Hydrolysis |
|---|---|---|
| 10 | 10 | 19 |
| 11 | 5 | 16 |
| 12 | 2 | 10 |

EXAMPLES 13–14

A more accurate evaluation of the NNDP-aqueous DEA solution of Example 7 was made under conditions more comparable to actual commercial operation. A feed gas consisting of 5 percent $H_2S$, 5 percent $CO_2$ and 500 ppm COS in nitrogen was passed at about 3.5 ml/min. into the base of a 20 tray Oldershaw distillation column and was contacted by a countercurrent flow of amine solution at about 10 ml/min. introduced near the top of the column. The amine solution had first been saturated with $H_2S$ and $CO_2$ under the conditions of the experiment so there was no further absorption of these gases. The temperature of the column was maintained at the indicated level throughout the test. Both the feed gas and the exit gas from the top of the column were analyzed as before by sensitive gas chromatographic equipment capable of measuring 10 ppm COS.

TABLE IV

| Example No. | Temp. °C | % COS Hydrolysis |
|---|---|---|
| 13 | 75 | 49 |
| 14 | 35 | 84 |

The NNDP-alkanolamine solution was more efficient at the lower temperature in contrast to other gas-treating solutions where higher temperatures were necessary for maximum COS hydrolysis. This experiment was run at atmospheric pressure.

We claim:

1. A process for hydrolyzing COS to $H_2S$ and $CO_2$ which comprises contacting a COS-containing gas with an aqueous piperazinone compound solution, said piperazinone compound having the formula

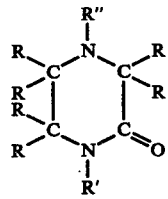

wherein R', R", and each R is independently a hydrogen atom or an alkyl group of 1–5 carbon atoms.

2. The process of claim 1 wherein the piperazinone compound solution contains at least a molar equivalent quantity of water based on the COS.

3. The process of claim 2 wherein the piperazinone compound is present in an aqueous solution containing about 1–25 percent by weight of water and at least about 35 percent piperazinone compound.

4. The process of claim 3 wherein the aqueous solution also contains up to about 60 percent of a lower alkanolamine.

5. The process of claim 4 wherein the alkanolamine is diethanolamine.

6. The process of claim 3 wherein the piperazinone compound is 1,4-dimethylpiperazinone.

7. The process of claim 6 wherein the COS-containing gas is contacted with the aqueous piperazinone compound at about 10°–50° C.

8. The process of claim 6 wherein a COS-containing gas is contacted in a first process stage with the aqueous piperazinone compound solution, thereby causing the hydrolysis of at least the major part of the COS content, and the contacted gas is then contacted with a sour gas purification solvent in a second process stage.

9. The process of claim 6 wherein the COS-containing gas is contacted with the aqueous piperazinone compound under superatmospheric pressure.

* * * * *